UNITED STATES PATENT OFFICE.

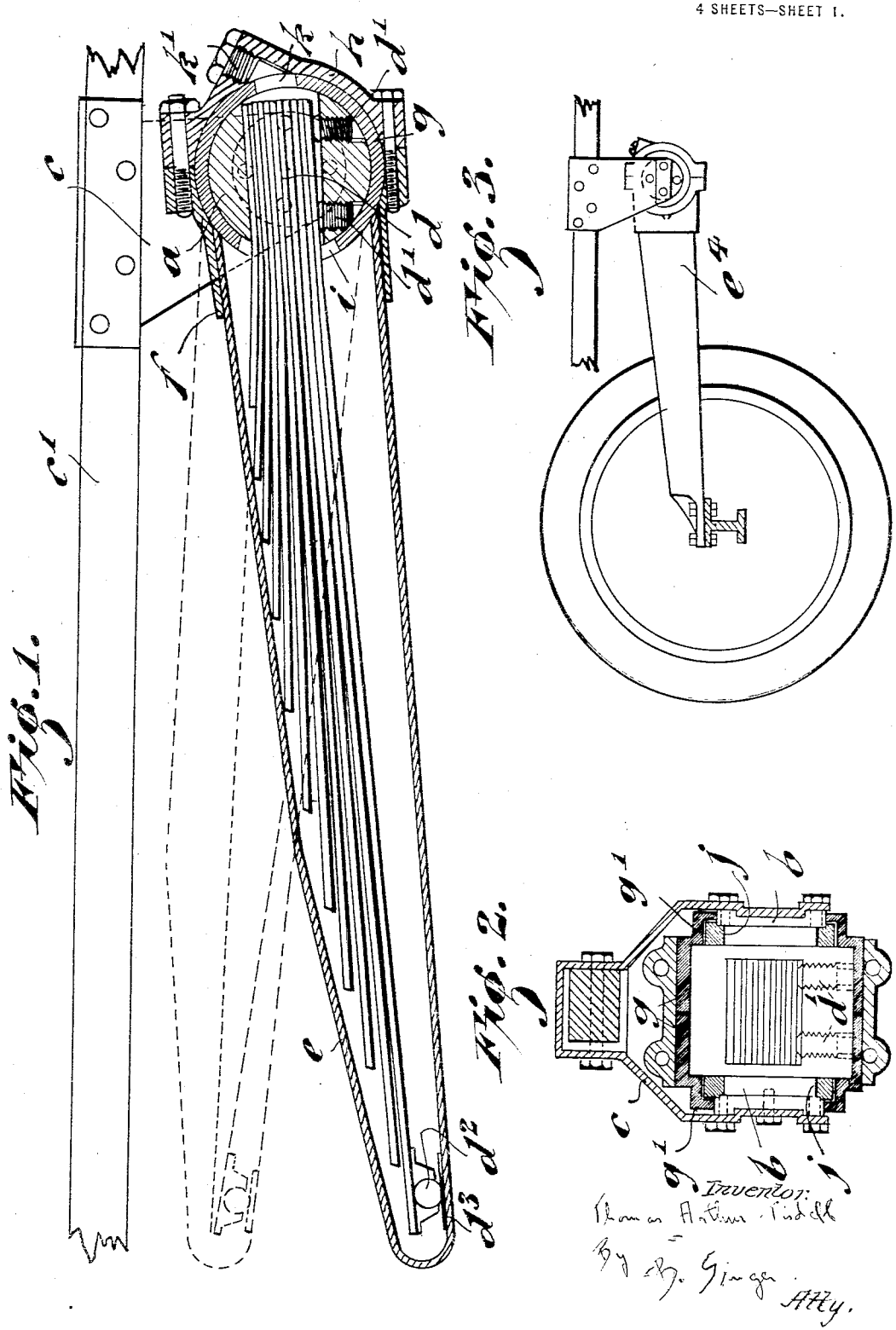

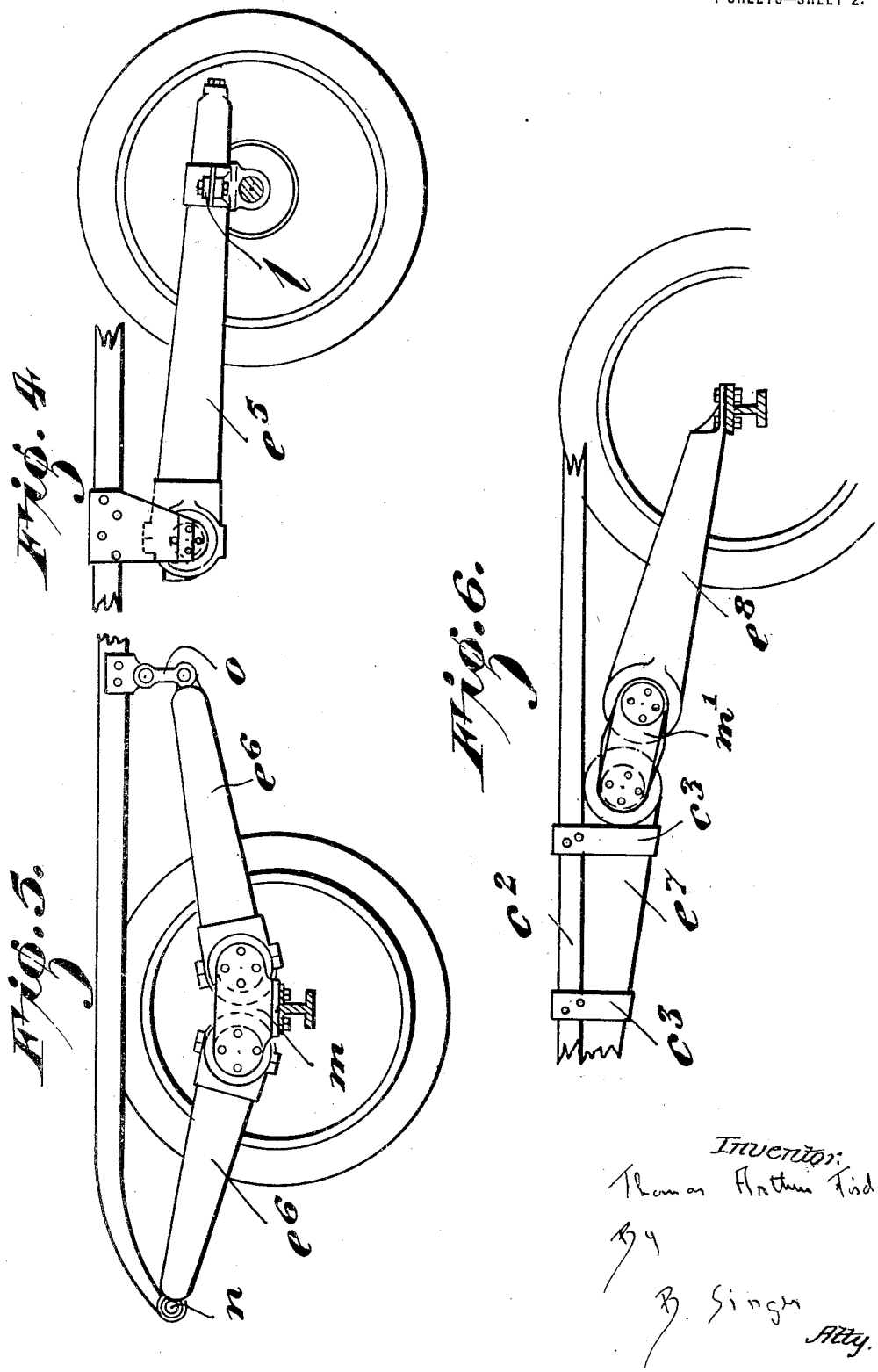

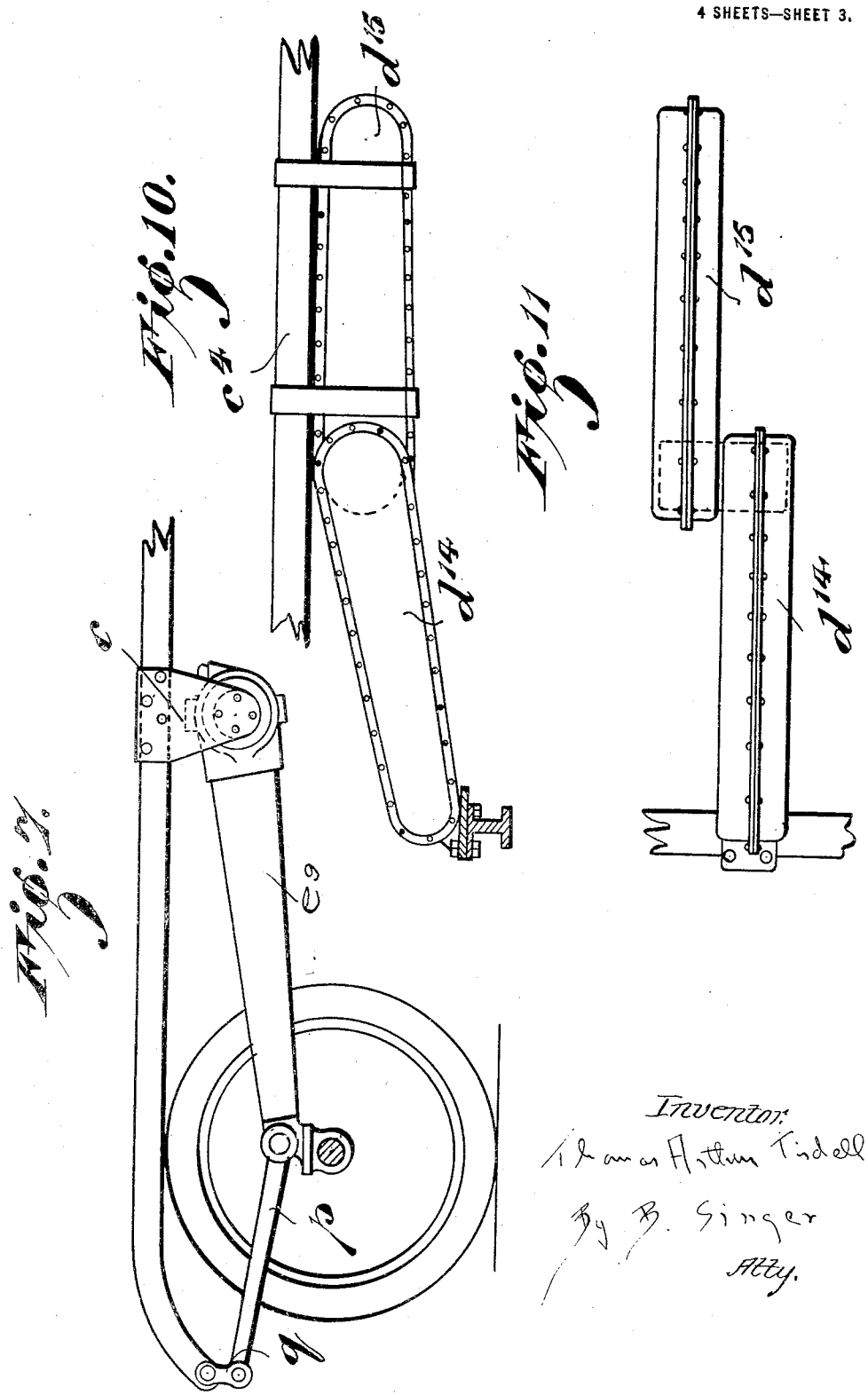

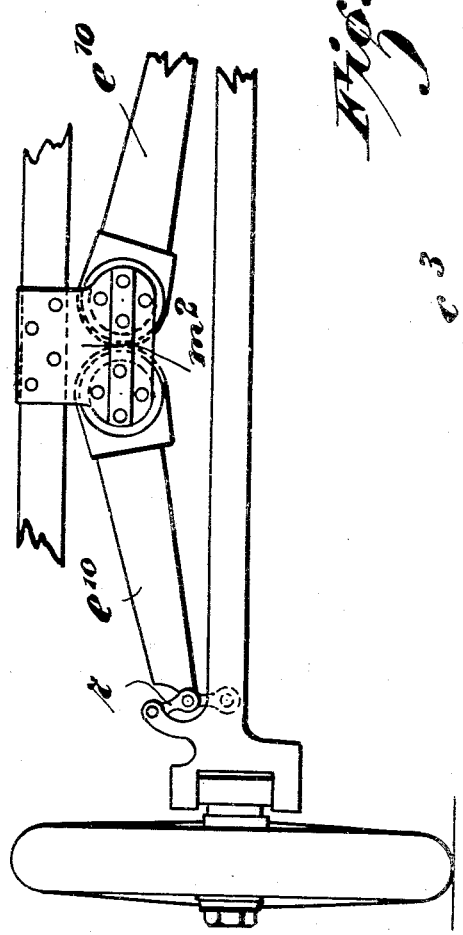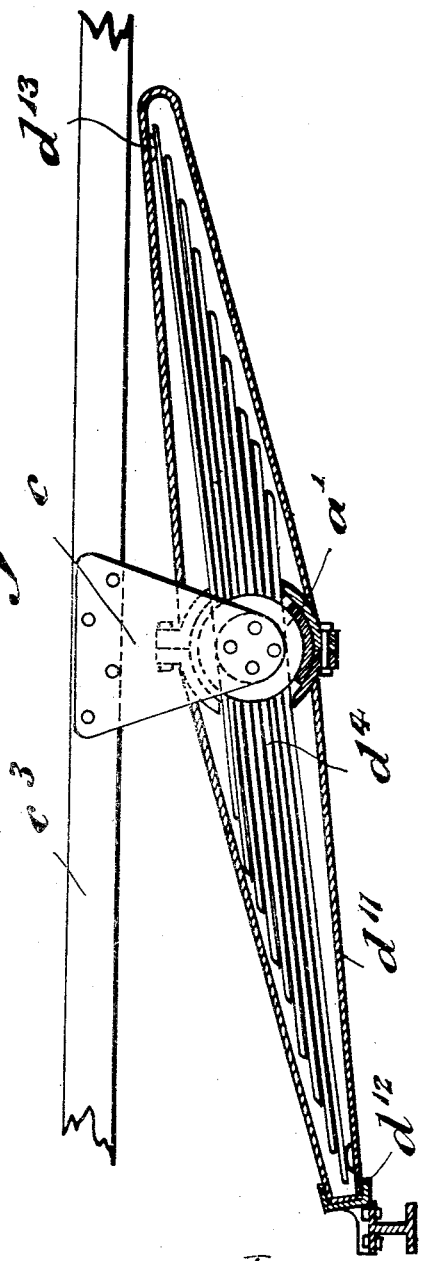

THOMAS ARTHUR TISDELL, OF BIRMINGHAM, ENGLAND.

SPRING.

1,331,539.  Specification of Letters Patent.  Patented Feb. 24, 1920.

Application filed September 6, 1918. Serial No. 252,894.

*To all whom it may concern:*

Be it known that I, THOMAS ARTHUR TISDELL, a subject of the Kingdom of Great Britain, residing at 102 City road, Edgbaston, Birmingham, in the county of Warwick, England, engineer, have invented certain new and useful improvements in or relating to springs such as used in connection with the spring suspension of motor road-vehicles and the like, of which the following is a specification.

This invention comprises certain improvements in or relating to springs, such as used in connection with the spring suspension of motor road vehicles, and the like, and it has for its purpose to render the spring more durable, and generally to improve the methods of springing heretofore in vogue.

The present invention is particularly applicable to the laminated or equivalent type of spring, and has for its purpose to provide for the satisfactory inclosing of such a spring so that it is relieved from atmospheric and other conditions and protected from dirt, and so that oil, grease, or the like can be satisfactorily confined in the vicinity of the spring, in the case of a laminated spring, to permit of relative movement between the laminæ of which the spring is composed.

The present invention therefore provides primarily a lubricant casing for a spring of this type. This casing is of such a character as to permit of the desired movement of the spring or a part or parts thereof in its movement. Advantageously the casing involves a pivotal or axial joint or joints.

In connection with road and other vehicles it has been appreciated that if the spring is sufficiently strong to withstand and intercept the substantial shocks, it is generally too strong to intercept the minor vibrations.

The present invention has further for its purpose to provide for the absorption of the minor vibrations in a more effective manner, and by a much simpler construction.

The present invention therefore furthermore provides a spring, one or certain of the laminæ of which are at its or their free end or ends, or throughout any suitable part of its or their length, spaced from the other laminæ in such a manner that upon the spring being deflected, the spaced lamina or laminæ first of all move until they are contiguous with the other laminæ. This, in the case of a single lamina, requires only a slight stress, and the spring effort thus overcome is enabled to satisfactorily absorb minor vibrations. After the lamina has moved into contiguity with the other laminæ, the latter are enabled to operate to absorb the more prominent shocks. The casing prevents admission of dust and other foreign matter to the spaces between the laminæ and enables the relative movement to effectively take place.

In cases in which a number of the laminæ are spaced from each other, the function of absorbing the shocks is a successive one. First of all the uppermost lamina (in the case of a spring having its concave surface uppermost) moves into contact with the next lamina absorbing the smallest vibrations; then the next lamina moves into contact with the third lamina absorbing more substantial vibrations, and so on, until the whole of the laminæ are in contact with each other and the major shocks are intercepted by the entire spring acting in the ordinary way.

The casing within which the laminated spring is inclosed may be adapted to pivotally move about the point at which the spring is secured to the chassis or other part upon which it is mounted. The casing may constitute the spring-controlled element, and said casing, instead of the spring, may be coupled to the other element, as for instance by a shackle.

In order that this invention may be clearly understood and readily carried into practice, reference may be had to the appended explanatory sheets of drawings, upon which:—

Figure 1 is a side sectional elevation of a spring according to the present invention.

Fig. 2 is an end sectional elevation of the spring shown in Fig. 1.

Figs. 3, 4, 5, 6, 7, 8, 9, and 10 illustrate in elevation modified embodiments of the present invention.

Fig. 11 is a plan of the embodiment shown in Fig. 10.

In one convenient embodiment of the present invention, and describing its application to the cantaliver type of laminated spring which is rigidly secured at its one extremity to the chassis or like part, a circular barrel *a* is provided having axial trunnions *b* which project into the limbs of a U-shaped bracket *c* rigidly secured to the chassis *c¹*. The trunnions of the barrel are keyed.

screwed, or rigidly secured to prevent rotation of the barrel. Between the ends of the barrel part and the limbs of the bracket within which the trunnions engage, spaces are left.

Transversely through the barrel a square or other aperture is provided. Within this aperture the laminated spring $d$ is adapted to be rigidly secured, as for instance by screws $d^1$. The laminated spring thus projects from this trunnion, and the free end thereof is enabled to rise and fall in the spring action.

The spring $d$ is composed of laminæ of successively increasing lengths rigidly secured together at one extremity by the screws $d^1$. The longest lamina is throughout its length or throughout a part or half of its length near to the free end of the spring curved in a slightly increased degree so that it diverges from the adjacent lamina. In like manner, the second and the third, or any suitable number of the laminæ, may diverge from the succeeding lamina.

Or the first, second, or third laminæ may collectively diverge from the others, that is to say, the separately operable elements of the spring may each involve more than one lamina.

The said spring is entirely inclosed within a casing adapted to oscillate about the axis of the barrel $a$. In the construction shown the casing comprises a tapered sheet metal tubular member $e$ closed at one extremity and widening in a direction toward the barrel $a$. At a point adjacent to the barrel $a$ said member $e$ is received within a socket $f$ provided in a composite member adapted to embrace the barrel $a$. This composite member comprises a circular bearing member $g$, which for convenience of assemblage is divided into two halves transversely of the axis of the barrel $a$. This bearing member $g$ is gripped between the base part of the socket $f$ and the strap-like part $h$, which parts are securely bolted together around the composite bearing member $g$. $i$ is an aperture provided in the bearing member $g$ through which the spring $d$ passes, and which aperture is of size permitting of rotation of the bearing member $g$ about the barrel $a$. At each axial extremity of the barrel $a$, the bearing member $g$ is furnished with inward flanges $g^1$ of cranked crossed-section, which, in conjunction with annular recesses in the trunnions $b$ of the barrel $a$, form annular spaces adapted to accommodate felt washers $j$ adapted to confine lubricant and exclude dust and like foreign matter. $k$ is an opening in the bearing member $g$ through which lubricant may be admitted by way of a screw plug $k^1$.

At its extremity remote from the barrel $a$ the longest lamina of the spring $d$ may carry a roller $d^2$ or other part adapted to slide or roll on a bearing $d^3$ provided at the inner face of the casing $e$. The wheel axle may be secured to the casing $e$, as for instance at a point on the outer side of the part of the wall thereof with which the bearing $d^3$ is provided.

The casing, may be more strongly built and may, as shown in Fig. 3, itself be adapted to function as a radius rod $e^4$, to which the wheel is coupled in any suitable manner. In this arrangement the projecting extremity of the spring may alternatively coöperate with the casing $e^4$ in any suitable manner, as for instance by bearing upon a transverse roller therein or by projecting between two transverse rollers located within the casing $e^4$.

Fig. 4 shows a modification of the embodiment shown in Fig. 3, in which the wheel is secured to the casing $e^5$ by a divided clip $l$ secured to the wheel and embracing the casing. Between the clip $l$ and the casing rubber or other flexible packing may be incorporated. With the arrangement according to this embodiment the effective length of the casing $e$ may be thus shortened in relation to the length of the spring, with the obtaining of increased flexibility and greater lateral rigidity.

Fig. 5 illustrates an embodiment of the invention in which the wheel carries a bracket $m$ to which two of the barrels $a$ are fixed, and from which barrels the casings $e^6$ containing springs extend, one of said casings being pivoted to the chassis at $n$, and the other being coupled to the chassis by a link $o$.

Fig. 6 illustrates an embodiment of the invention in which an arrangement of casings and bracket similar to those $e^6$ and $m$, shown in Fig. 5, are incorporated, but with one of the casings $e^7$ rigidly secured to the chassis $c^2$, as for instance by clips $c^3$, the bracket $m^1$ being oscillatorily movable in relation to the casing $e^7$, and the casing $e^8$ being oscillatorily movable in relation to the bracket $m^1$. The wheel is secured to the projecting extremity of the casing $e^8$.

The embodiment illustrated in Fig. 7 approximates that illustrated in Fig. 3, but involves in addition a radius rod $p$ pivoted at one extremity to the wheel end of the casing $e^9$ and connected at its other extremity to the chassis by a link $q$. The embodiment shown in Fig. 8 approximates that shown in Fig. 5, but involves the mechanism of Fig. 5 in inverted disposition and located transversely of the car, $m^2$ being a bracket fixed to the chassis in which two of the fixed barrels $a$ are incorporated. In relation to the said barrels casings $e^{10}$ are adapted to oscillate. These casings $e^{10}$ are connected at their projecting extremities by links $r$ to the transverse wheel carrying element.

In the embodiment shown in Fig. 9, a spring $d^4$ projects on both sides of the fixed barrel $a^1$, the laminæ increasing in length downwardly of the spring on one side of the barrel and upwardly of the spring on the other side of the barrel. The casing $d^{11}$ which incloses this spring $d^4$ and which is adapted to oscillate about the axis of the barrel $a^1$, carries at one extremity $d^{12}$ the wheel axle, and at its other extremity carries an internal bearing $d^{13}$ upon which the corresponding end of the spring $d^4$ bears. Elevation of the wheel in relation to the chassis $c^3$ has the effect of upwardly flexing the part of the spring to the left of the barrel $a^1$ (in Fig. 9) and of depressing the part of the casing $d^{11}$ to the right of the barrel $a^1$, with the result that the parts of the spring $d^4$ on both sides of the barrel $a^1$ are flexed in a direction toward the shorter laminæ of said parts.

The embodiment illustrated in Figs. 10 and 11 approximates that illustrated in Fig. 6, but differs in that instead of employing two barrels $a$ located eccentrically and connected by a bracket, it involves co-axial barrels rigidly or integrally connected together. The casing $d^{14}$ which carries the wheel is adapted to oscillate upon a barrel, the one trunnion of which is integral with or rigidly secured to an adjacent trunnion of another co-axial barrel adapted to oscillate within the casing $d^{15}$, which latter is suitably secured to the chassis $c^4$.

What I claim as my invention, and desire to secure by Letters Patent is:—

1. In combination, an element, a spring rigidly fixed to said element and extending in one direction therefrom, and a rigid casing inclosing the spring, said casing being pivotally mounted on said element and hence arranged to move with the spring.

2. In combination, an element, a leaf spring rigidly fixed to said element and extending in one direction therefrom, the leaves of said spring diverging in such direction, and a rigid casing inclosing the spring and pivotally mounted on said element for movement with the spring, the dimensions of the casing exceeding those of the spring to such an extent as to permit limited independent movement of the spring in the casing.

3. In combination with relatively movable vehicle members, an element rigidly fixed to one of said members, a spring rigidly fixed to said element and extending in one direction therefrom, and a rigid casing inclosing the spring, pivotally mounted on said rigidly fixed element and connected to the other vehicle member.

In witness whereof I have hereunto set my hand in the presence of two witnesses.

THOMAS ARTHUR TISDELL.

Witnesses:
ARTHUR H. BROWN,
A. J. DAVIES.